(12) United States Patent
Lee

(10) Patent No.: US 12,208,792 B2
(45) Date of Patent: Jan. 28, 2025

(54) STEERING CONTROL APPARATUS AND METHOD

(71) Applicant: HL Klemove Corp., Incheon (KR)

(72) Inventor: DongWoong Lee, Seongnam (KR)

(73) Assignee: HL KLEMOVE CORP., Incheon (KR)

( * ) Notice: Subject to any disclaimer, the term of this patent is extended or adjusted under 35 U.S.C. 154(b) by 277 days.

(21) Appl. No.: 17/820,635

(22) Filed: Aug. 18, 2022

(65) Prior Publication Data

US 2023/0075998 A1    Mar. 9, 2023

(30) Foreign Application Priority Data

Sep. 7, 2021  (KR) ......................... 10-2021-0118772

(51) Int. Cl.
*B60W 30/09*    (2012.01)
*B60W 10/20*    (2006.01)
(Continued)

(52) U.S. Cl.
CPC ............ *B60W 30/09* (2013.01); *B60W 10/20* (2013.01); *B60W 30/0956* (2013.01); *B60W 40/04* (2013.01); *B60W 40/072* (2013.01); *B60W 50/0097* (2013.01); *B62D 15/0265* (2013.01); *G06V 10/25* (2022.01); *G06V 20/588* (2022.01); *H04W 4/46* (2018.02); *B60W 2050/0083* (2013.01); *B60W 2420/403* (2013.01);
(Continued)

(58) Field of Classification Search
None
See application file for complete search history.

(56) References Cited

U.S. PATENT DOCUMENTS 9,311,818 B2 *  4/2016  Lin ........................ G08G 1/167
9,751,506 B2 *  9/2017  Mudalige .............. G01S 17/931
(Continued)

FOREIGN PATENT DOCUMENTS

CA   3094275 A1 *  9/2019  ............. G06N 20/00
CA   3098595 A1 * 11/2019  ............. G01C 21/32
(Continued)

OTHER PUBLICATIONS

Office Action issued in Korean Patent Application No. 10-2021-0118772 dated Apr. 9, 2024.
(Continued)

*Primary Examiner* — Kevin R Steckbauer
(74) *Attorney, Agent, or Firm* — Harvest IP Law, LLP

(57) ABSTRACT

The present disclosure relates to a steering control apparatus and a method. More specifically, the steering control apparatus according to the present disclosure includes: a receiver that receives first vehicle traveling information and first vehicle vicinity information of a host vehicle from a plurality of sensors and a navigator; and a controller that sets a monitoring range (a region of interest (ROI)) on a traveling path on which the host vehicle is predicted to travel based on the first vehicle traveling information and the first vehicle vicinity information, determines a possibility of a collision between the host vehicle and an object in a case where the object is detected inside the monitoring range, and generates a control signal used for avoiding a collision with the object in a case where the possibility of the collision is a threshold point or higher.

12 Claims, 8 Drawing Sheets

(51) Int. Cl.
  *B60W 30/095* (2012.01)
  *B60W 40/04* (2006.01)
  *B60W 40/072* (2012.01)
  *B60W 50/00* (2006.01)
  *B62D 15/02* (2006.01)
  *G06V 10/25* (2022.01)
  *G06V 20/56* (2022.01)
  *H04W 4/46* (2018.01)

(52) U.S. Cl.
  CPC ... *B60W 2552/30* (2020.02); *B60W 2554/402* (2020.02); *B60W 2556/65* (2020.02)

(56) References Cited

U.S. PATENT DOCUMENTS

| | | | | |
|---|---|---|---|---|
| 10,479,274 | B2* | 11/2019 | Park | G08G 1/162 |
| 10,730,512 | B2* | 8/2020 | Kutila | B60W 30/09 |
| 11,092,970 | B2* | 8/2021 | Herman | G05D 1/0257 |
| 11,214,244 | B2* | 1/2022 | Kwon | B60T 8/17558 |
| 11,235,758 | B2* | 2/2022 | Sung | B60W 10/18 |
| 11,315,424 | B2* | 4/2022 | Visintainer | B60W 30/0956 |
| 11,318,934 | B2* | 5/2022 | Ohmura | G06V 20/58 |
| 11,414,073 | B2* | 8/2022 | Visintainer | G08G 1/164 |
| 11,518,394 | B2* | 12/2022 | Visintainer | G08G 1/096791 |
| 11,667,278 | B2* | 6/2023 | Kim | B60W 30/16 701/78 |
| 11,668,783 | B2* | 6/2023 | Nishiwaki | H04W 4/46 455/456.1 |
| 11,679,762 | B2* | 6/2023 | Lee | B60W 30/0953 701/26 |
| 11,753,035 | B2* | 9/2023 | Tanaka | B60W 30/0956 701/23 |
| 11,756,416 | B2* | 9/2023 | McQuillen | H04W 4/40 701/117 |
| 11,964,691 | B2* | 4/2024 | Prasad Challa | B60W 30/0953 |
| 2014/0341434 | A1* | 11/2014 | Lin | G08G 1/167 382/104 |
| 2016/0071417 | A1* | 3/2016 | Lewis | G08G 1/162 701/301 |
| 2016/0167579 | A1* | 6/2016 | Hwang | G08G 1/163 340/435 |
| 2016/0203719 | A1* | 7/2016 | Divekar | B60T 7/18 348/118 |
| 2017/0101056 | A1* | 4/2017 | Park | G08G 1/162 |
| 2017/0113665 | A1* | 4/2017 | Mudalige | G08G 1/163 |
| 2019/0143967 | A1* | 5/2019 | Kutila | B60W 60/0016 701/23 |
| 2019/0287394 | A1* | 9/2019 | Aoude | G08G 1/096716 |
| 2019/0329762 | A1* | 10/2019 | Kwon | B60W 30/0956 |
| 2020/0257308 | A1* | 8/2020 | Herman | G05D 1/0231 |
| 2020/0331467 | A1* | 10/2020 | Ohmura | B60W 30/16 |
| 2020/0377079 | A1* | 12/2020 | Sung | B60W 10/04 |
| 2021/0024061 | A1* | 1/2021 | Visintainer | G08G 1/164 |
| 2021/0046941 | A1* | 2/2021 | Visintainer | G08G 1/163 |
| 2021/0118295 | A1* | 4/2021 | Visintainer | G08G 1/163 |
| 2021/0201664 | A1* | 7/2021 | McQuillen | G08G 1/091 |
| 2021/0237723 | A1* | 8/2021 | Lee | G08G 1/167 |
| 2022/0034991 | A1* | 2/2022 | Nishiwaki | H04W 4/029 |
| 2022/0041159 | A1* | 2/2022 | Kim | G08G 1/16 |
| 2022/0048504 | A1* | 2/2022 | Prasad Challa | B60W 30/0953 |
| 2022/0332319 | A1* | 10/2022 | Park | B60W 30/143 |
| 2022/0348227 | A1* | 11/2022 | Foster | G06V 20/588 |
| 2023/0075998 | A1* | 3/2023 | Lee | G06V 20/588 |
| 2024/0059285 | A1* | 2/2024 | Ng | B60W 50/14 |

FOREIGN PATENT DOCUMENTS

| | | | | |
|---|---|---|---|---|
| CN | 1929637 | A * | 3/2007 | G01S 13/931 |
| CN | 104166973 | A * | 11/2014 | B60R 1/00 |
| CN | 105939915 | A * | 9/2016 | B60K 28/14 |
| CN | 104166973 | B * | 4/2017 | B60R 1/00 |
| CN | 106608263 | A * | 5/2017 | B60T 7/12 |
| CN | 106608263 | B * | 12/2018 | B60T 7/12 |
| CN | 105939915 | B * | 6/2019 | B60K 28/14 |
| CN | 110406531 | A * | 11/2019 | B60Q 1/52 |
| CN | 110463232 | A * | 11/2019 | B60W 30/16 |
| CN | 110481550 | A * | 11/2019 | B60W 30/165 |
| CN | 111599200 | A * | 8/2020 | G08G 1/096725 |
| CN | 111824088 | A * | 10/2020 | B60T 7/22 |
| CN | 110481550 | B * | 6/2021 | B60W 30/165 |
| CN | 111599200 | B * | 11/2021 | G08G 1/096725 |
| CN | 110406531 | B * | 7/2022 | B60Q 1/52 |
| CN | 117584956 | A * | 2/2024 | B60W 50/14 |
| DE | 102020102965 | A1* | 8/2020 | G05D 1/0061 |
| DE | 112018008136 | T5 * | 8/2021 | G01S 5/0072 |
| DE | 102022108963 | A1* | 10/2022 | B60Q 1/343 |
| DE | 102022003326 | A1* | 3/2023 | B60W 30/09 |
| DE | 102023120759 | A1* | 4/2024 | B60W 30/14 |
| EP | 3560778 | A1* | 10/2019 | B60Q 1/52 |
| EP | 3560778 | B1* | 3/2022 | B60Q 1/52 |
| EP | 4052982 | A1* | 9/2022 | B60K 28/06 |
| EP | 4052982 | B1* | 8/2023 | B60K 28/06 |
| EP | 3544293 | B1* | 2/2024 | B60R 1/00 |
| JP | 2004106673 | A * | 4/2004 | B60W 40/02 |
| JP | 2016218996 | A * | 12/2016 | B60T 7/12 |
| JP | 2023132318 | A * | 9/2023 | |
| JP | 2023132319 | A * | 9/2023 | |
| JP | 7386280 | B2 * | 11/2023 | |
| JP | 7386281 | B2 * | 11/2023 | |
| KR | 20080022748 | A | 3/2008 | |
| KR | 20140004291 | A | 1/2014 | |
| KR | 20180014151 | A * | 2/2018 | B60R 19/483 |
| KR | 20190109720 | A | 9/2019 | |
| KR | 1020190103508 | A | 9/2019 | |
| KR | 1020210050925 | A | 5/2021 | |
| KR | 2021089846 | A * | 7/2021 | B60Q 1/52 |
| KR | 20210089846 | T5 | 7/2021 | |
| WO | WO-2019078866 | A1* | 4/2019 | B60W 30/09 |
| WO | WO-2022232823 | A1* | 11/2022 | B60Q 1/346 |

OTHER PUBLICATIONS

Office Action (Notice of Allowance) of Korea Patent Office dated Nov. 22, 2024.

* cited by examiner

STEERING CONTROL APPARATUS AND METHOD

CROSS-REFERENCE TO RELATED APPLICATION

This application claims priority from Korean Patent Application No. 10-2021-0118772, filed on Sep. 7, 2021, which is hereby incorporated by reference for all purposes as if fully set forth herein.

BACKGROUND OF THE INVENTION

Field of the Invention

Embodiments relate to a steering control apparatus and a method.

Description of Related Art

Recently, many Advanced Driver Assistance Systems (ADAS) controlling vehicles using radar devices used for detecting objects present in the vicinity have been developed.

For example, among ADAS technologies, Lane Following assist (LFA), Lane Keeping assist (LKA), and Forward Collision-Avoidance Assist (FCA) that are also to autonomous traveling vehicles are functions for assisting a driver to travel more safely.

In accordance with commercialization of such driver assist systems, sensors such as cameras take an essential role for providing driver safety functions.

However, in a case where a recognition range of a camera sensor is restricted due to a weather change, being during the night, a structural restriction, and the like, a recognition performance becomes relatively low, which may cause a delay in provision of a warning or an alarm to a driver.

In accordance with this, a method for expanding a maximum recognizable range using other kinds of information without being dependent only on a camera sensor has been requested.

SUMMARY OF THE INVENTION

In such a background, the present disclosure provides a steering control apparatus and a method for increasing a risk recognition range by utilizing Vehicle to Vehicle (V2V) communication with a preceding vehicle and a navigation.

In order to solve the problems described above, in one aspect, the present disclosure provides a steering control apparatus including: a receiver that receives first vehicle traveling information and first vehicle vicinity information of a host vehicle from a plurality of sensors and a navigator; and a controller that sets a monitoring range (a region of interest (ROI)) on a traveling path on which the host vehicle is predicted to travel based on the first vehicle traveling information and the first vehicle vicinity information, determines a possibility of a collision between the host vehicle and an object in a case where the object is detected inside the monitoring range, and generates a control signal used for avoiding a collision with the object in a case where the possibility of the collision is a threshold point or higher.

In another aspect, the present disclosure provides a steering control method including: receiving first vehicle traveling information and first vehicle vicinity information of a host vehicle from a plurality of sensors and a navigator; setting a monitoring range (a region of interest (ROI)) on a traveling path on which the host vehicle is predicted to travel based on the first vehicle traveling information and the first vehicle vicinity information; and determining a possibility of a collision between the host vehicle and an object in a case where the object is detected inside the monitoring range and generating a control signal used for avoiding a collision with the object in a case where the possibility of the collision is a threshold point or higher.

According to the present disclosure, a steering control apparatus and a method can omnidirectionally provide a collision prevention in-advance prediction effect by collecting vehicle recognition information for not only the same direction as a traveling direction of a vehicle but also omni-directions of 360 degrees by applying V2V communication.

DETAILED DESCRIPTION OF THE INVENTION

Figure 1:
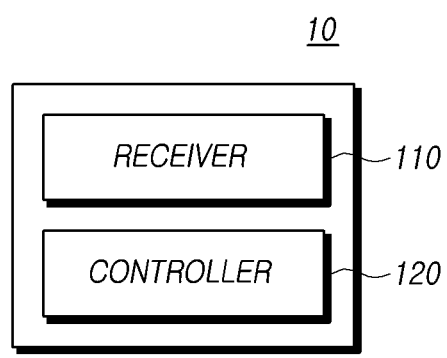
FIG. 1 is a block diagram illustrating a steering control apparatus according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, a steering control apparatus (10) according to an embodiment of the present disclosure will be described with reference to the attached drawings.

FIG. 1 is a block diagram illustrating a steering control apparatus (10) according to an embodiment of the present disclosure.

Referring to FIG. 1, the steering control apparatus (10) according to an embodiment of the present disclosure may include a receiver (110), a controller (120), and the like.

The steering control apparatus (10) according to an embodiment of the present disclosure may be an Advance Driver Assistance System (ADAS) that is mounted in a host vehicle (20) and provides information assisting traveling of the host vehicle (20) or provides assist for driver's control of the host vehicle (20).

Here, the ADAS may represent various types of cutting-edge driver assist systems, and, as driver assist systems, for example, an Autonomous Emergency Braking (AEB) system, a Smart Parking Assistance System (SPAS), a Blind Spot Detection (BSD) system, an Adaptive Cruise Control (ACC) system, a Lane Departure Warning System (LDWS) system, a Lane Keeping Assist System (LKAS), a Lane Change Assist System (LCAS), and the like may be included. However, the driver assist systems are not limited thereto.

Here, a host vehicle (20) may represent a vehicle that has a motor mounted thereon and is produced to move on the ground by rolling wheels using power of the motor without using railroads or installed lines. In addition, the host vehicle (20) may be an electric vehicle that is a vehicle having electricity as its power and obtains driving energy by rotating a motor using electricity accumulated in a battery instead of obtaining driving energy from combustion of fossil fuel.

The steering control apparatus (10) may be applied to a manned vehicle in which a driver gets and controls the host vehicle (20) and an autonomous traveling vehicle The receiver (110) may receive first vehicle traveling information and first vehicle vicinity information of the host vehicle (20) from a plurality of sensors.

The plurality of sensors may include an image sensor, a vehicle-speed sensor, a steering angle sensor, a GPS sensor, and the like.

Here, the image sensor may include a camera sensor, a LiDAR sensor, a radar sensor, and the like.

More specifically, the camera sensor may output image data or video data to a detection area in accordance with specifications of each sensor.

For example, the camera sensor may be a video camera module that reproduces an image by converting the image into an electric signal. Here, if the electric signal is processed in accordance with a standard signal (NTSC) and is connected to a video tape recorder (VTR) and a monitor television set, a video of a subject may be reproduced.

Here, the video data includes a series of unit frame videos. In other words, the video data is composed of a series of video frames. If a frame rate is 60 frames per second (FPS), it may represent that 60 still images per second, that is, a unit frame video is transmitted or received. Thus, a video frame, a frame video, or a unit frame are used to represent almost the same concept, and a used term may be slightly different in accordance with whether an indicated target is a frame or data.

Thus, video data captured by a camera sensor is configured by image data and accordingly may represent image data captured from the camera sensor. Hereinafter, in the present disclosure, video information captured from a camera sensor may represent image data captured from the camera sensor.

For example, the image data captured by a camera sensor may be generated in the format of one of AVI, which is a raw form, MPEG-4, H.264, Divx, and JPEG. For example, image data captured by a camera sensor may be processed by a processor. Here, the processor may be included in the camera sensor or may be included in a controller (120) to be described below. In addition, a separate module that performs the function of the processor may be mounted.

The LiDAR sensor is an abbreviation of "Light Detection And Ranging" and may be an active exploration device that obtains desired information without any direct contact with an object through a laser using the same principle as that of a radar. In addition, the LiDAR is a device that is mounted to an airplane in which a Global Positioning System (GPS) and an Inertial Navigation System (INS) are mounted and can perform not only acquisition of a precise three-dimensional Digital Elevation Mode (DEM) but also measurement of a submarine and submarine topography having a low water level. The LiDAR can extract an object and a lane more accurately than an image sensor such as a camera and have a detection area of a wide range.

The radar sensor may be an array antenna in which one or more transmission antennas and one or more reception antennas are included, and each transmission/reception antenna is formed by connecting one or more radiating elements in series using a power feed line and is not limited thereto.

Such a radar sensor may include a plurality of transmission antennas and a plurality of reception antennas and have an antenna array structure of various forms according to an array sequence, an array interval, and the like.

The radar sensor can perform a function of switching to one of a plurality of transmission antennas included in the radar sensor and transmitting a transmission signal through the switched transmission antenna or transmitting a transmission signal through a multi-transmission channel assigned to a plurality of transmission antennas.

Such a radar sensor includes an oscillator that generates transmission signals for one transmission channel assigned to the switched transmission antenna or a multi-transmission channel assigned to a plurality of transmission antennas. For example, such an oscillator may include a Voltage-Controlled Oscillator (VCO), an oscillator, and the like.

The radar sensor can receive a reception signal received by being reflected on an object through a reception antenna.

In addition, the radar sensor can perform a function of switching to one of a plurality of reception antennas and receiving a reception signal that is a reflection signal acquired by reflecting a transmission signal transmitted through the switched reception antenna on a target or receiving a reception signal through a multi-reception channel assigned to a plurality of reception antennas.

Such a radar sensor may include: a Low Noise Amplifier (LNA) that amplifies reception signals received through one reception channel assigned to a switched reception antenna or received through a multi-reception channel assigned to a plurality of transmission antennas with low noise; a mixer that mixes reception signals that have been amplified with low noise; an amplifier that amplifies a mixed reception signal; an Analog Digital Converter (ADC) that generates reception data by converting the amplified reception signal into a digital signal, and the like.

The sensors described above may be mounted to a front face, a lateral face, and a rear face of the host vehicle (20) in accordance with the uses thereof and, as necessary, a plurality of each of the sensors may be mounted.

Information received using the sensors described above may be defined as first vehicle vicinity information In other words, the first vehicle vicinity information may be information received from sensors mounted to the host vehicle (20). For example, the first vehicle vicinity information may be information about objects detected by a radar sensor and information about objects detected by a camera sensor.

The first vehicle vicinity information may be a position of the host vehicle (20) received from a navigator mounted to the host vehicle (20) and information about the vicinity of the host vehicle (20).

Here, the navigator may be a device that displays a current position of a vehicle during traveling and a map of the vicinity using a display screen. The navigator may determine a current position of a vehicle by receiving radio waves from GPS satellites, read a map of a part corresponding to the current position of the vehicle from built-in map data, and display the current position of the vehicle and the map of the vicinity on a display screen.

Such a navigator may receive arrival position information as an input, determine a traveling path from the current position to an arrival position, in other words, a first vehicle traveling path, and output the first vehicle traveling path on a display screen.

The receiver (110) may receive the first vehicle traveling path from the navigator.

A monitoring range (a region of interest (ROI)) (310) may be set on a traveling path on which the host vehicle (20) is predicted to travel based on the first vehicle traveling information and the first vehicle vicinity information, in a case where an object is detected inside the monitoring range (310), a possibility of a collision between the host vehicle (20) and the object may be determined, and, in a case where the possibility of the collision described above is a threshold point or higher, a control signal used for avoiding a collision with the object described above may be generated.

Here, a case where the possibility of a collision is the threshold point or higher, for example, may be a case where an operation condition for an Autonomous Emergency Braking (AEB) system is satisfied.

The controller (120) may classify a type of object detected based on the first vehicle vicinity information and set a monitoring range (310) in accordance with the type of the classified object.

Figure 2:
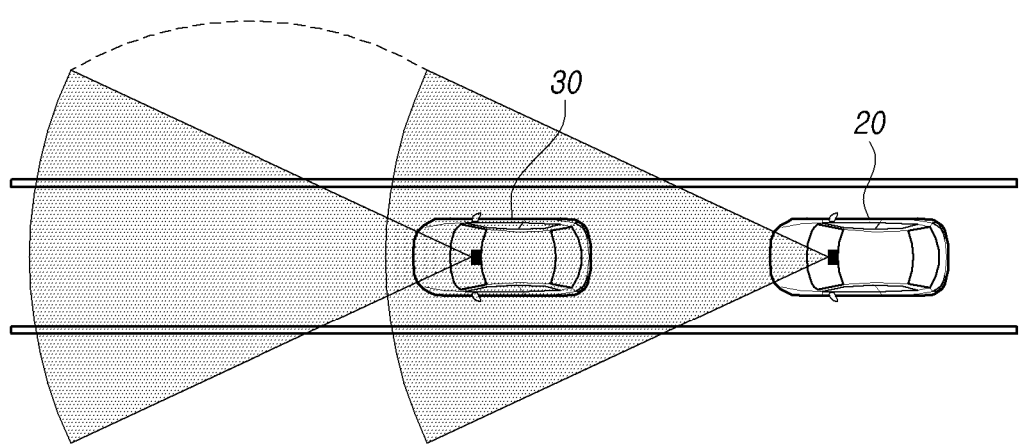
FIG. 2 is a diagram illustrating expansion of a recognition range of a host vehicle through V2V communication with a preceding vehicle according to an embodiment.

FIG. 2 is a diagram illustrating expansion of a recognition range of a host vehicle (20) through V2V communication with a preceding vehicle (30) according to an embodiment.

In a case where the classified object is a preceding vehicle (30), the receiver (110) may further receive second vehicle traveling information and second vehicle vicinity information of the preceding vehicle (30) through Vehicle to Vehicle (V2V) communication with the preceding vehicle (30).

Referring to FIG. 2, the controller (120) may set the monitoring range (310) based on the second vehicle traveling information and the second vehicle vicinity information. Here, the second vehicle traveling information and the second vehicle vicinity information may be received by the preceding vehicle (30) from a plurality of sensors and a navigator mounted to the preceding vehicle (30) and transmitted to the steering control apparatus (10) mounted to the host vehicle (20).

The preceding vehicle (30) may be classified based on the first vehicle vicinity information and the first vehicle traveling information. For example, in a case where an object is detected on a traveling path of the host vehicle (20) determined by the navigator, is positioned in front of the host vehicle (20), and is a vehicle, the object may be classified into a preceding vehicle (30). However, the configuration is not limited thereto, and it is apparent that a vehicle that travels in the vicinity of the host vehicle (20) and is able to transmit/receive vicinity information through V2V communication may be set as a preceding vehicle (30).

By additionally setting a monitoring range (310) based on the first vehicle traveling information and the first vehicle vicinity information, a collision prevention prediction range of the host vehicle (20) can be increased in accordance with the increased expanded monitoring ranges (310). The possibility of a collision of the increased monitoring ranges (310) may not be determined based on only the second vehicle traveling information and the second vehicle vicinity information but may be determined with the first vehicle traveling information and the first vehicle vicinity information additionally taken into account.

Then, in a case where the preceding vehicle (30) deviates from the traveling path of the host vehicle (20) that has been determined by the navigator or is spaced apart from the host vehicle (20) by a distance set in advance or more, the classification into the preceding vehicle (30) is canceled, and the setting of the monitoring range (310) generated based on the second vehicle traveling information and the second vehicle vicinity information may be interrupted.

Figure 3:
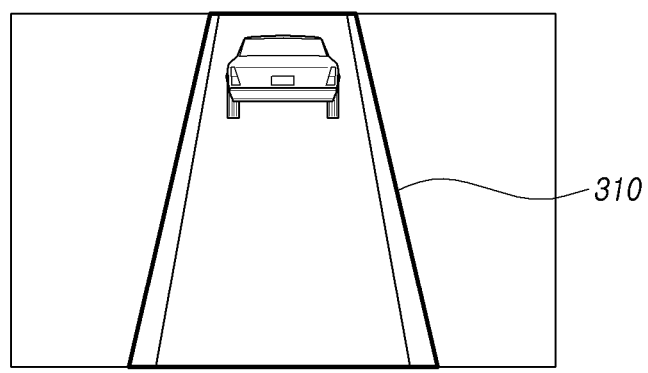
FIG. 3 is a diagram illustrating setting of a monitoring range (a region of interest (ROI)) in a case where a traveling path of a host vehicle is a direction of a straight line in accordance with an embodiment.

FIG. 3 is a diagram illustrating setting of a monitoring range (310) in a case where a traveling path of a host vehicle (20) is a direction of a straight line in accordance with an embodiment.

Referring to FIG. 3, in a case where the traveling path is in the direction of the straight line, the controller (120) may set a traveling lane of the host vehicle (20) as the monitoring range (310). In one embodiment, as in FIG. 3, the controller (120) may classify a traveling lane of the host vehicle (20) in a Field of View (FOV) of the camera sensor and set the classified traveling lane as the monitoring range (310). The traveling path of the host vehicle (20) may be determined based on the first vehicle traveling information.

In addition, the controller (120) may set a monitoring range (310) for a vehicle traveling in front and a pedestrian as targets. For example, the controller (120) may set a monitoring range (310) that includes a vehicle traveling on a lane adjacent to that of the host vehicle (20).

Figure 4:
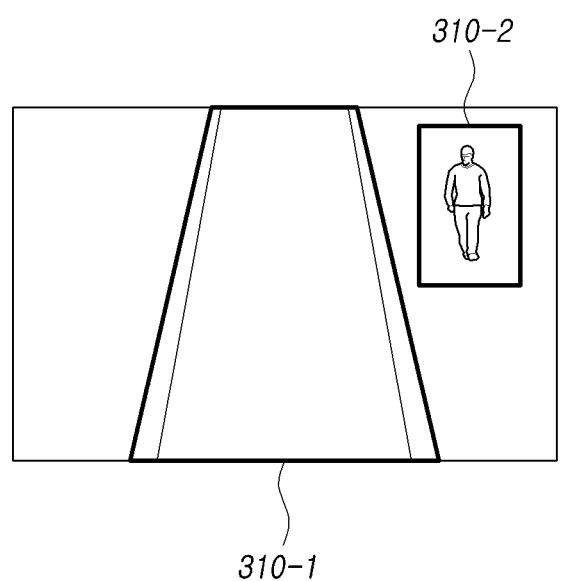
FIG. 4 is a diagram illustrating setting of a monitoring range in a case where a pedestrian is detected in accordance with an embodiment.

FIG. 4 is a diagram illustrating setting of a monitoring range (310) in a case where a pedestrian is detected in accordance with an embodiment.

Referring to FIG. 4, in a case where a classified object is a pedestrian, the controller (120) may further set a monitoring range (310-2). More specifically, in a case where the traveling path of the host vehicle (20) is in the direction of the straight line as illustrated in FIG. 4, a traveling lane of the host vehicle (20) is set as a monitoring range (310-1), and, in a case where an object detected in front of the host vehicle (20) is classified into a pedestrian, a monitoring range (310-2) including the pedestrian may be additionally set. In other words, two monitoring ranges (310-1 and 310-2) may be set. In a case where there are a plurality of pedestrians, a monitoring range (310) corresponding to the number of pedestrians may be additionally set.

In one embodiment, the controller (120) may determine a movement direction of a pedestrian based on information about pedestrians included in the first vehicle vicinity information. In a case where the movement direction of the pedestrian is determined to be direction away from the host vehicle (20) that is during traveling, the controller (120) may eliminate the monitoring range (310) for the corresponding pedestrian.

Figure 5:
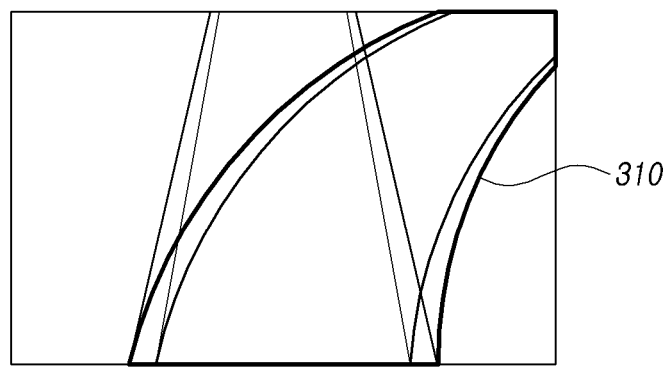
FIG. 5 is a diagram illustrating setting of a monitoring range in a case where a traveling direction of a host vehicle is a direction of a curved line in accordance with an embodiment.

FIG. 5 is a diagram illustrating setting of a monitoring range (310) in a case where a traveling direction of a host vehicle (20) is a direction of a curved line in accordance with an embodiment.

Referring to FIG. 5, in a case where the traveling path of the host vehicle (20) is in a direction of a curved line, a lane positioned in the direction of the curved line may be set as the monitoring range (310). More specifically, in a case where the host vehicle (20) needs to make a right turn for the traveling path of the host vehicle (20), the controller (120) may determine a traveling lane after the right turn to be a lane positioned in the direction of the curved line described above. Such a lane may be determined in advance using the first vehicle traveling information.

If a traveling path that is a curved line can be classified using an image sensor, the monitoring range (310) is set to a result of the classification. On the other hand, in a case where a traveling path that is a curved line cannot be classified using an image sensor, in other words, in a case where a lane after traveling in the direction of the curved line is classified, and a lane in the process of traveling of the curved line is not classified, the controller (120) may generate a virtual lane and set the monitoring range (310) for the virtual lane.

In addition, in a case where a traveling path is in the direction of a curved line, the controller (120) may set a monitoring range (310) to include a blind spot area of the direction.

Figure 6:
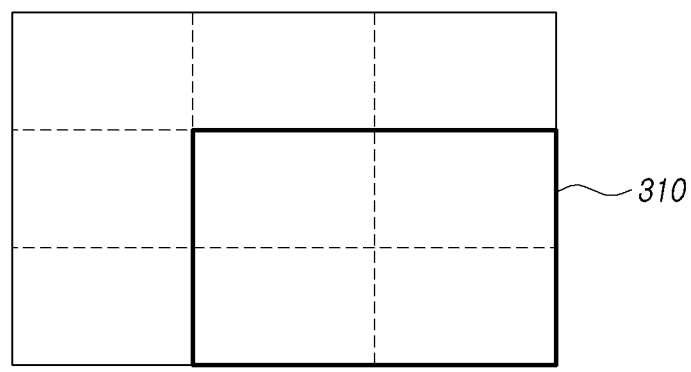
FIG. 6 is a diagram illustrating setting of at least one of a plurality of divided areas as a monitoring range in accordance with an embodiment.

FIG. 6 is a diagram illustrating setting of at least one of a plurality of divided areas as a monitoring range (310) in accordance with an embodiment.

The controller (120) may divide image data captured by an image sensor into a plurality of regions having the same area and set at least one of the plurality of divided regions as a monitoring range (310).

Referring to FIG. 6, image data captured using an image sensor may be divided into 9 regions having the same area, and in a case where the traveling path of the host vehicle (20) is in the direction of a curved line for a right turn based on the first vehicle traveling information, the controller (120) may set a monitoring range (310) as illustrated in FIG. 6. Here, by setting a blind spot for the direction of the curved line in advance, the processing speed for the monitoring range (310) can be raised. For example, in the case of the direction of the curved line for a right turn as illustrated in FIG. 6, the controller (120) may set a region of a lowermost end on the right side as a blind spot for the direction of the curved line among the divided regions and include the region at the time of setting the monitoring range (310).

According to the description presented above, the steering control apparatus (10) according to the present disclosure can improve a collision prevention prediction range by setting the monitoring range (310) along the traveling path in advance.

Such a steering control apparatus (10) may be realized using an Electronic Controller Unit (ECU), a microcomputer, or the like.

In one embodiment, a computer system (not illustrated) such as the steering control apparatus (10) and the like may be realized using an Electronic Control Unit (ECU). The electronic control unit may include at least one or more elements among one or more processors, a memory, a storage, a user interface inputter, and a user interface outputter, and these may communicate with each other through a bus. The computer system may further include a network interface used for connection to a network. The processor may be a CPU or a semiconductor element that executes processing commands stored in a memory and/or a storage. The memory and the storage may include various types of volatile/nonvolatile storage media. For example, the memory may include a ROM and a RAM.

Hereinafter, a steering control method using the steering control apparatus (10) capable of performing all of the present disclosure described above will be described.

Figure 7:
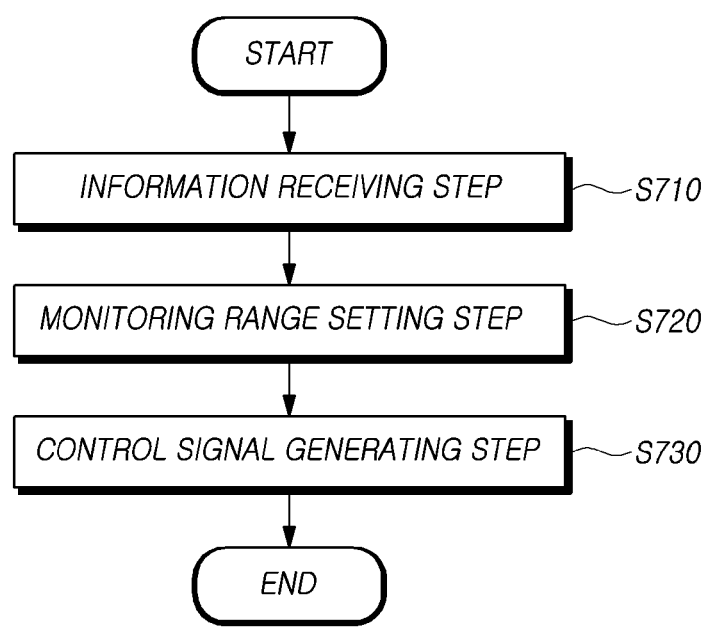
FIG. 7 is a flowchart illustrating a steering control method according to an embodiment of the present disclosure.

FIG. 7 is a flowchart illustrating a steering control method according to an embodiment of the present disclosure.

Referring to FIG. 7, the steering control method according to the present disclosure may include: an information receiving step (S710) of receiving first vehicle traveling information and first vehicle vicinity information of a host vehicle (20) from a plurality of sensors; a monitoring range (310) setting step (S720) of setting a monitoring range (310) on a traveling path on which the host vehicle (20) is predicted to travel based on the first vehicle traveling information and the first vehicle vicinity information; and a control signal generating step (S730) of determining a possibility of a collision between the host vehicle (20) and an object in a case where the object is detected inside the monitoring range (310) and generating a control signal used for avoiding a collision with the object in a case where the possibility of the collision is a threshold point or higher.

In the control signal generating step (S730), image data captured by an image sensor may be divided into a plurality of regions having the same area, and at least one region among the plurality of divided regions may be set as the monitoring range (310).

Figure 8:
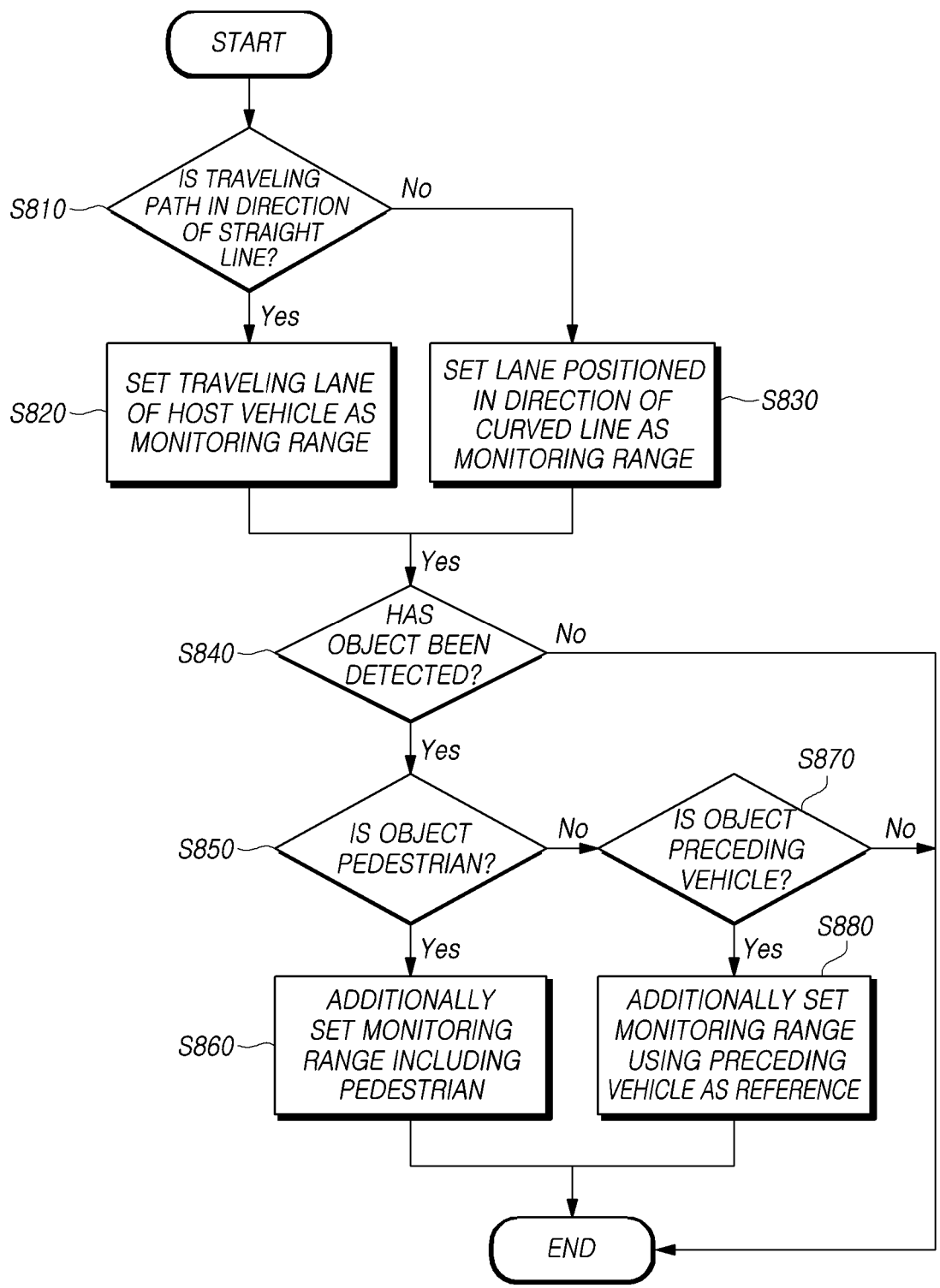
FIG. 8 is a flowchart for more specifically illustrating Step S720 according to an embodiment.

FIG. 8 is a flowchart for more specifically illustrating Step S720 according to an embodiment.

Referring to FIG. 8, the steering control apparatus (10) may determine whether the traveling path of the host vehicle (20) is in a direction of a straight line (S810). The steering control apparatus (10) may determine whether the traveling path along which the host vehicle (20) is planned to move is in a direction of a straight line or a direction of a curved line based on first vehicle traveling information received from a navigator.

In a case where the traveling path of the host vehicle (20) is in the direction of a straight line (Yes in S810), the steering control apparatus (10) may set a traveling lane of the host vehicle (20) as the monitoring range (310) (S820).

In a case where the traveling path of the host vehicle (20) is not in the direction of a straight line (No in S810), the steering control apparatus (10) may set a lane positioned in a direction of a curved line as the monitoring range (310) (S830). For example, in the case of a direction of a curved line that is a right-turn direction, a traveling lane on which the host vehicle (20) travels after a right turn may be set as the monitoring range (310). In addition, a blind spot that cannot be detected by a driver by making the right turn may be additionally included in the monitoring range (310).

The steering control apparatus (10) may determine whether an object has been detected from the first vehicle vicinity information (S840). The steering control apparatus (10) may detect an object from a plurality of sensors mounted to the host vehicle (20) and, for example, may detect an object through a radar sensor, a LiDAR sensor, a camera sensor, and the like.

In a case where an object has been detected in the vicinity of the host vehicle (20) (Yes in S840), the steering control apparatus (10) may classify a type of the object and determine whether the classified object is a pedestrian (S850). In other words, in the control signal generating step (S730), a type of the detected object may be classified based on the first vehicle vicinity information, and the monitoring range (310) may be set based on the type of the classified object.

In a case where the classified object is a pedestrian (Yes in S850), the steering control apparatus (10) may additionally set a monitoring range (310) including the pedestrian (S860).

On the other hand, in a case where the classified object is not a pedestrian (No in S850), the steering control apparatus (10) may determine whether the classified object is a preceding vehicle (30) (S870).

In a case where the classified object is the preceding vehicle (30) (Yes in S870), the steering control apparatus (10) may receive second vehicle traveling information and second vehicle vicinity information from the preceding vehicle (30) through V2V communication and additionally set a monitoring range (310) based on the second vehicle traveling information and the second vehicle vicinity information (S880).

As described above, according to the present disclosure, a steering control apparatus and a method can omnidirectionally provide a collision prevention in-advance prediction effect by collecting vehicle recognition information for not only the same direction as a traveling direction of a vehicle but also omni-directions of 360 degrees by applying V2V communication.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

EXPLANATION OF REFERENCES

10 steering control apparatus
110 receiver
120 controller

What is claimed is:

1. A steering control apparatus installed on a host vehicle comprising:
   a sensor installed on the host vehicle and configured to generate sensing information;
   a navigator mounted on the host vehicle and configured to provide traveling path information of the host vehicle;
   a network interface operable to communicate with a nearby vehicle which is traveling around the host vehicle via a vehicle-to-vehicle (V2V) communication, and receive nearby-vehicle-providing information from the nearby vehicle; and
   a controller configured to
     classify the nearby vehicle as a reference vehicle when a distance between the host vehicle and the nearby vehicle is less than a reference distance,
     set a monitoring range (a region of interest (ROI)) on a traveling path on which the host vehicle is predicted to travel based on the sensing information and the traveling path information, and further based on the nearby-vehicle-providing information from the nearby vehicle when the nearby vehicle is classified as the reference vehicle,
     calculate a collision possibility score between the host vehicle and an object in a case where the object is detected inside the monitoring range, and
     generate a control signal to control steering of the host vehicle or to operate an autonomous emergency braking (AEB) to avoid a collision with the object based on the collision possibility score,
   wherein the controller is further configured to cancel the nearby vehicle's classification as the reference vehicle and to exclude the nearby-vehicle-providing information received from the nearby vehicle in setting of the monitoring range when the distance between the host vehicle and the nearby vehicle becomes larger than the reference distance.

2. The steering control apparatus according to claim 1, wherein the controller classifies a type of the detected object based on the sensing information and sets the monitoring range based on the classified type of the object.

3. The steering control apparatus according to claim 2, wherein, in a case where the classified object is a pedestrian, the controller additionally sets a monitoring range including the pedestrian.

4. The steering control apparatus according to claim 1, wherein, in a case where the traveling path is in a direction of a curved line, the controller sets a lane positioned in the direction of the curved line as the monitoring range.

5. The steering control apparatus according to claim 1, wherein, in a case where the traveling path is in a direction of a straight line, the controller sets a traveling lane of the host vehicle as the monitoring range.

6. The steering control apparatus according to claim 1, wherein the sensor includes an image sensor capturing and generating image data and the controller divides the image data into a plurality of regions having the same area and sets at least one region among the plurality of divided regions as the monitoring range.

7. A steering control method performed by a steering control apparatus installed on a host vehicle comprising:
sensing and generating by a sensor installed on the host vehicle, sensing information;
providing by a navigator mounted on the host vehicle, traveling path information of the host vehicle;
receiving, by a network interface, nearby-vehicle-providing information from a nearby vehicle which is traveling around the host vehicle via a vehicle-to-vehicle communication (V2V);
classifying, by a controller, a nearby vehicle as a reference vehicle when a distance between the host vehicle and the nearby vehicle is less than a reference distance;
setting, by the controller, a monitoring range (a region of interest (ROI)) on a traveling path on which the host vehicle is predicted to travel based on the sensing information and the traveling path information, and further based on the nearby-vehicle-providing information from the nearby vehicle when the nearby vehicle is classified as the reference vehicle;
calculating, by the controller, a collision possibility score between the host vehicle and an object in a case where the object is detected inside the monitoring range and generating a control signal to control steering of the vehicle to avoid a collision with the object or to operate an autonomous emergency braking (AEB) based on the collision possibility score; and
cancelling, by the controller, the nearby vehicle's classification as the reference vehicle and excluding the nearby-vehicle-providing information received from the nearby vehicle in setting of the monitoring range when the distance between the host vehicle and the nearby vehicle becomes larger than the reference distance.

8. The steering control method according to claim 7, further comprising classifying, by the controller, a type of the detected object based on the sensing information, and the monitoring range is set based on the classified type of the object.

9. The steering control method according to claim 8, wherein, in the determining of a collision possibility score and the generating of a control signal, in a case where the classified object is a pedestrian, a monitoring range including the pedestrian is additionally set.

10. The steering control method according to claim 7, wherein, in the determining of a collision possibility score and the generating of a control signal, in a case where the traveling path is in a direction of a curved line, a lane positioned in the direction of the curved line is set as the monitoring range.

11. The steering control method according to claim 7, wherein, in the determining of a collision possibility score and the generating of a control signal, in a case where the traveling path is in a direction of a straight line, a traveling lane of the host vehicle is set as the monitoring range.

12. The steering control method according to claim 7, wherein, in the determining of a collision possibility score and the generating of a control signal, image data captured by an image sensor is divided into a plurality of regions having the same area, and at least one region among the plurality of divided regions is set as the monitoring range.

* * * * *